United States Patent
Allemand et al.

(10) Patent No.: US 10,716,425 B2
(45) Date of Patent: Jul. 21, 2020

(54) ITEM OF COOKWARE HAVING A TEXTURED OUTER FACE MADE OF TEXTURED STAINLESS STEEL

(71) Applicant: SEB S.A., Ecully (FR)

(72) Inventors: Simon Allemand, Cran Gevrier (FR);
Mickaël Meyer, Rumilly (FR);
Stephane Tuffe, Cognin (FR)

(73) Assignee: SEB S.A., Ecully (FR)

(*) Notice: Subject to any disclaimer, the term of this patent is extended or adjusted under 35 U.S.C. 154(b) by 887 days.

(21) Appl. No.: 15/106,594

(22) PCT Filed: Dec. 18, 2014

(86) PCT No.: PCT/FR2014/053407
§ 371 (c)(1),
(2) Date: Jun. 20, 2016

(87) PCT Pub. No.: WO2015/092288
PCT Pub. Date: Jun. 25, 2015

(65) Prior Publication Data
US 2016/0331174 A1  Nov. 17, 2016

(30) Foreign Application Priority Data
Dec. 19, 2013  (FR) ..................... 13 63078

(51) Int. Cl.
*A47J 27/00* (2006.01)
*B21D 51/22* (2006.01)
(Continued)

(52) U.S. Cl.
CPC ............ *A47J 27/002* (2013.01); *A47J 36/02* (2013.01); *A47J 36/025* (2013.01); *A47J 36/06* (2013.01);
(Continued)

(58) Field of Classification Search
CPC ........ A47J 27/002; A47J 36/025; A47J 36/02; A47J 36/06; A47J 37/00; B21D 51/22;
(Continued)

(56) References Cited

U.S. PATENT DOCUMENTS 2,057,254 A * 10/1936 Sommer ................. A47J 36/02
220/573.1
2,139,143 A * 12/1938 Wiswell ................. B30B 9/321
222/82
(Continued)

FOREIGN PATENT DOCUMENTS

EP   0247932 A2   12/1987
EP   2138079 A1   12/2009
(Continued)

OTHER PUBLICATIONS

Translation of FR2808732. Sitram, Nov. 16, 2001, p. 4. (Year: 2001).*

(Continued)

*Primary Examiner* — Robert J Hicks
(74) *Attorney, Agent, or Firm* — The Webb Law Firm

(57) ABSTRACT

Provided is a method for obtaining an item of cookware, including the following steps of: —producing or providing a blank from a textured sheet of stainless steel having at least one textured face, —stamping the blank in order to form a cap (2) having an inner face (3) and an outer face (4), the outer face (4) having parts in relief corresponding to the textured face of the blank, —optionally, partially covering the outer face (4) of the cap (2), —carrying out a mechanical finishing treatment of the free surface of the outer face (4) of the cap (2) in order to expose the stainless steel at the parts in relief of the free surface of the outer face (4) of the cap (2). Also provided is an item of cookware including a stamped cap (2) made of stainless steel having an inner face (Continued)

(3) and an outer face (4), wherein the outer face (4) of the cap (2) has a textured free surface (5).

14 Claims, 3 Drawing Sheets

(51) Int. Cl.
  *B23P 15/00* (2006.01)
  *A47J 36/02* (2006.01)
  *A47J 36/06* (2006.01)
  *A47J 37/00* (2006.01)
(52) U.S. Cl.
  CPC .............. *A47J 37/00* (2013.01); *B21D 51/22* (2013.01); *B23P 15/00* (2013.01); *B23P 2700/05* (2013.01)
(58) Field of Classification Search
  CPC ......... B21D 51/18; B21D 51/16; B23P 15/00; B65D 7/42; B65D 7/04; B65D 1/40
  USPC ......... 220/573.2, 572.1, 573.3, 62.17, 92.16, 220/92.11, 912, 62.16, 62.11, 674, 669
  See application file for complete search history.

(56) References Cited

U.S. PATENT DOCUMENTS

| | | | | | |
|---|---|---|---|---|---|
| 2,179,491 | A | * | 11/1939 | Cain | C03C 3/108 359/884 |
| 2,518,483 | A | * | 8/1950 | Mapes | A47J 36/02 72/47 |
| 3,788,513 | A | * | 1/1974 | Racz | A47J 36/02 428/622 |
| 3,909,591 | A | * | 9/1975 | Ulam | A47J 27/002 219/438 |
| 5,257,717 | A | * | 11/1993 | Galle | A47J 36/02 228/173.6 |
| 5,586,681 | A | * | 12/1996 | Policappelli | B65D 1/16 206/459.5 |
| 6,248,435 | B1 | * | 6/2001 | Leck | B05D 3/207 220/573.2 |
| 8,464,892 | B2 | | 6/2013 | Bourdin et al. | |
| 2005/0204928 | A1 | * | 9/2005 | Bourdin | A47J 27/002 99/403 |

FOREIGN PATENT DOCUMENTS

| | | | | |
|---|---|---|---|---|
| FR | 2808732 A1 | | 11/2001 | |
| GB | 2076708 A | | 12/1981 | |
| GB | 2343365 A | * | 5/2000 | ............ A47J 37/101 |
| JP | H05245047 A | | 9/1993 | |
| KR | 1020090098398 A | | 9/2009 | |
| KR | 20100100513 A | | 9/2010 | |
| KR | 20140029612 A | | 3/2014 | |

OTHER PUBLICATIONS

Translation of KR20100100513. Lee. Sep. 15, 2010, p. 6. (Year: 2010).*

* cited by examiner

ITEM OF COOKWARE HAVING A TEXTURED OUTER FACE MADE OF TEXTURED STAINLESS STEEL

CROSS-REFERENCE TO RELATED APPLICATIONS

This application is the United States national phase of International Application No. PCT/FR2014/053407 filed Dec. 18, 2014, and claims priority to French Patent Application No. 1363078 filed Dec. 19, 2013, the disclosures of which are hereby incorporated in their entirety by reference.

FIELD OF THE INVENTION

The present invention relates to the technical field of cooking utensils made of stainless steel.

The present invention more specifically relates to cooking utensils produced by stamping a stainless steel blank, and to the related production process.

The present invention relates particularly to culinary items intended to be positioned over a heating element, for example a frying pan or casserole.

The present invention also relates to cooking lids and the detachable vessels of electrical cooking appliances.

DESCRIPTION OF RELATED ART

It is known to produce cooking utensils from stainless steel by stamping. During the stamping process, flaws may appear on the surface of the utensil, particularly on the outer face. The roping phenomenon is encountered primarily in ferritic stainless steels and primarily affects the side wall of the utensil. The orange peel phenomenon may occur primarily on the rounded sections connecting the base to the side wall of the utensil, and on the base to a lesser extent. To conceal the aforementioned flaws, the outer face requires extensive polishing.

Patent document GB 2 076 708 pertains to the production of a culinary item comprising a textured outer side. However, this outer face is made of aluminum or copper. The present document pertains to the use of stainless steel for the production of an inner face of a co-laminated culinary item.

Patent document KR 20100100513 pertains to the production of a stainless steel culinary item comprising a textured side. However, this textured face is an inner coated surface.

The present invention is intended to offer a method of producing a cooking utensil comprising an outer face of stamped stainless steel, making it possible to simplify the polishing of said outer face without degrading the exterior appearance of the cooking utensil.

SUMMARY OF THE INVENTION

The present invention is also intended to offer a cooking utensil comprising an outer face of stamped stainless steel that is less susceptible to scratches.

These objectives are reached through a method to produce a cooking utensil comprising the following steps:

Creation or provision of a sheet from a textured stainless steel blank having at least one textured side;

Stamping of the sheet to form a dome comprising an inner face and an outer side, the outer face having raised areas corresponding to the textured face of the sheet;

Optionally, partial coating of the outer face of the dome;

Mechanical finishing treatment of the free surface of the outer face of the dome, to reveal the stainless steel on the raised areas of the free surface of the outer face of the dome.

The use of the textured face of a stainless steel blank to create the outer face of the dome of a cooking utensil makes it possible to hide the flaws appearing during the production process, particularly during the stamping process.

A satisfactory surface appearance for the free surface of the outer face can be achieved with a mechanical finishing treatment, whereas with a smooth outer side, the stainless steel must be pre-polished.

In one embodiment, the mechanical finishing treatment comprises a brightening finishing polish, without a pre-polishing phase using abrasive particles. The concealment of flaws eliminates the need for any pre-polishing of the stainless steel, helping to reduce production times and limit polishing effluents and residues.

In one embodiment that allows for a colored outer side, the method consists of using a textured stainless steel blank comprising on its textured face a superficial oxide layer producing an interference coloring, and in performing the mechanical finishing treatment to remove the superficial oxide layer on the raised surfaces of the free surface of the outer face of the dome to reveal the stainless steel. These arrangements make it possible to protect the colored areas of the free surface of the outer face of the dome.

In another embodiment, the method consists of applying an exterior coating to the free surface of the outer face of the dome, and a mechanical finishing treatment with a brush to remove the exterior coating on the raised areas of the free surface of the outer face of the dome. These arrangements also make it possible to protect the coated areas of the free surface of the outer face of the dome.

In one embodiment adapted to the production of cooking utensils designed to be placed over heating plates, the method consists of performing a hot stamping assembly of the dome with an aluminum heat transfer plate to partially cover the outer face of the dome, and to perform a mechanical finishing treatment after the hot stamping assembly.

Advantageously, the method consists of performing a hot stamping assembly of the dome with an aluminum heat transfer plate partially covering the outer face of the dome and with a stainless steel base plate covering the heat transfer plate, and to perform a mechanical finishing treatment after the hot stamping assembly.

Thus, advantageously, to produce a cooking utensil suitable for induction heating, the base plate is made of ferritic stainless steel.

Also advantageously, the method consists of applying an interior coating to the inner face of the dome prior to the mechanical finishing treatment.

Thus, advantageously, the method consists of applying the interior coating to the inner face of the dome after the hot stamping assembly of the dome with the transfer plate.

In one advantageous arrangement, the method consists of using a circular sheet in the shape of a disc. However, other shapes may be considered.

These objectives are also reached by the means of a cooking utensil having a stamped dome of stainless steel with an inner face and an outer side, as the outer face of the dome has a textured free surface. This arrangement makes it possible to hide the mechanical flaws that appear over the cooking utensil's useful life, and in particular, the scratches created by metal utensils such as spatulas, or abrasive materials such as a Scotch-Brite™ scouring pad. This arrangement also helps to conceal mechanical flaws introduced by the dome stamping process.

Thus, advantageously, the outer face has a convexly curved circumferential wall and the textured free surface extends over the convexly curved circumferential wall. However, the textured free surface does not necessarily cover the entire convexly curved circumferential wall. This arrangement helps to conceal mechanical flaws appearing over the useful life of the cooking utensil. This arrangement also helps reduce the visibility of mechanical flaws introduced by the dome stamping process in the area of the convexly curved circumferential wall.

Thus, advantageously, the convexly curved circumferential wall is extended and surrounded by a circumferential side wall and the textured free surface extends over the circumferential side wall. However, the textured free surface does not necessarily cover the entire circumferential side wall. This arrangement helps to conceal mechanical flaws appearing over the useful life of the cooking utensil. This arrangement also helps reduce the visibility of mechanical flaws introduced by the dome stamping process in the area of the circumferential side wall, particularly for cooking utensils with a circumferential side wall that has a significant height with respect to its diameter, as is the case with casseroles, pans or the vessel of a cooking item.

Advantageously, the outer face of the dome has embossed indentations of a depth ranging between 20 to 100 μm.

In one embodiment adapted to the production of cooking utensils designed to be placed over heating plates, an aluminum heat transfer plate partially covers the outer face of the dome. This arrangement enhances the transfer of heat.

Thus, advantageously, a stainless steel base plate covers the heat transfer plate.

Thus, advantageously, to produce a cooking utensil suitable for induction heating, the base plate is made of ferritic stainless steel.

Also advantageously, the inner face of the dome has an interior coating. If the inner face of the dome is not coated, it is preferable to perform a finish by grinding.

Also advantageously, the free surface of the outer face of the dome comprises polished stainless steel protruding areas and depressed areas that may be coated and/or colored, as desired. The texture of the free surface of the stamped dome facilitates polishing.

In various embodiments, the depressed areas may in particular have one of the following surfaces: PTFE coating, ceramic coating, lacquer, superficial oxide layer producing an interference coloring.

Also advantageously, the dome is circular in shape.

In one embodiment, the cooking utensil comprises at least one handle mounted to the dome.

The utensil according to at least one of the aforementioned characteristics may be produced by the aforementioned method.

BRIEF DESCRIPTION OF THE DRAWINGS

The invention will be better understood through the study of several non-limiting embodiments, illustrated in the annexed figures, in which.

DETAILED DESCRIPTION OF THE INVENTION

Figure 1:
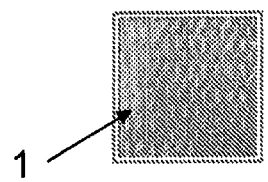
FIGS. 1 through 5 are five embodiments of stainless steel blanks used in the method and the cooking utensil according to the invention.
Figure 2:
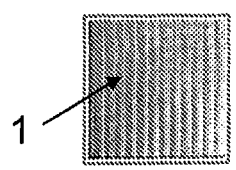
Figure 3:
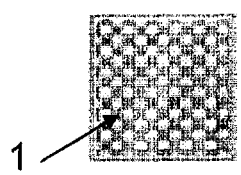
Figure 4:
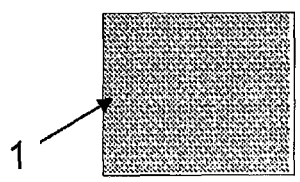
Figure 5:
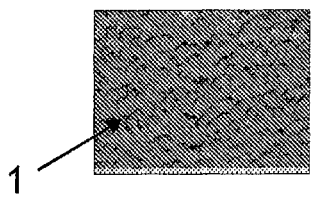

FIGS. 1 to 5 depict various example embodiments of the textured stainless steel blank. The outer face of these blanks is not simply flat or polished, but rather has a pattern in relief, or in other words, a texture that form a textured face (1). The pattern may be repetitive. The pattern in relief in this case would be regular and repeating. The pattern in relief may have two clearly distinguishable axes of symmetry, particularly in the following forms: embossing (FIG. 1); lines (FIG. 2); checkerboard (FIG. 3); weaving or canvas (FIG. 4). However, the pattern in relief is not necessarily repetitive. The pattern in relief may in fact be irregular, as shown in FIG. 5.

The raw material used is a stainless steel blank that has undergone a supplemental embossing process during lamination.

The stainless steel may be an austenitic stainless steel (for example, a 304 grade stainless steel) or a ferritic stainless steel (for example, a 430, 441, or 436 grade stainless steel).

The blanks are mechanically embossed using a printing cylinder having a pattern in relief.

Two types of embossing finishes are possible: etching on a single surface (the other face remaining smooth), or etching on both surfaces. Embossing a single surface is preferable for cooking utensil applications. The embossed surface is preferably a convex surface forming an exterior part of the cooking utensil.

Even when a single surface is embossed, the embossed patterns will still be transferred onto the smooth surface. To prevent the inner face of the culinary utensil from having a rough, "orange peel" appearance, the use of embossing textures with a repeating pattern is preferable.

Furthermore, as the pattern is embossed to a greater depth, this transfer will be more evident on the smooth surface. Preferably the embossed indentations have a depth ranging between 20 to 100 μm.

Embossing is performed during the laminating process using special cylinders. The embossing lamination process preserves the properties of the passive stainless steel layer. Embossing is followed by a bright annealing process. This process makes it possible to restore the ductility of the material for proper stamping, to preserve the material's shine and to impart a passive layer for optimal corrosion resistance.

These processes make it possible to produce a homogenous and reproducible surface finish for various grades and sizes.

For ferritic grades, the texture makes it possible to partially conceal the roping phenomenon appearing on the side wall of the stamped culinary utensil. The polishing operation is thus improved.

All of the processes to produce a stainless steel cooking utensil are then carried out: a sheet of stainless steel is cut, the sheet is stamped to form a dome (2), the advantageous stamping of a transfer base (10), the eventual interior and/or exterior coating, followed by the polishing of the free surface of the outer face of the dome (2).

If the sheet's largest dimension is smaller than the circumference of the embossed laminating cylinder having a non-repeating pattern, or smaller than the size of a repeating pattern on an embossed laminating cylinder, the texture of the textured face of the dome will appear to be non-repeating.

The transfer base (10) typically comprises a heat transfer plate (11) made of aluminum inserted between a base plate (12) made of stainless steel and the stamped dome (2) of the cooking utensil made of embossed stainless steel. The base plate (12) may in particular by made of ferritic stainless steel, to produce a cooking utensil suitable for induction heating. If desired, the base plate (12) may take the form of a cup.

Figure 6:
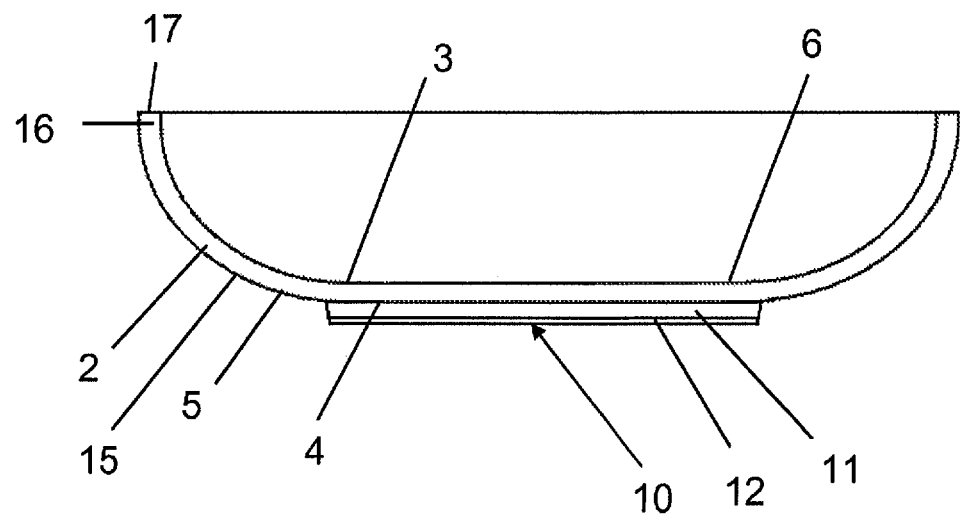
FIG. 6 depicts a schematic cross-sectional view of one embodiment of a cooking utensil according to the invention, comprising a textured stainless steel dome with its transfer base.

The cooking utensil depicted in FIG. 6 comprises a dome (2) made of stainless steel having an inner face (3) and an outer face (4). The dome (2) has a circular shape. The outer face (4) of the dome (2) has a textured free surface (5). The aluminum heat transfer plate (11) partially covers the outer face (4) of the dome (2) leaving the free surface (5) visible.

As FIG. 6 clearly depicts, the outer face (4) has a convexly curved circumferential wall (15). Thus the textured free surface (5) extends over the convexly curved circumferential wall (15). In the example embodiment depicted in FIG. 6, the convexly curved circumferential wall (15) is extended and surrounded by a circumferential side wall (16). The circumferential side wall (16) extends up to an upper edge (17) of the dome (2). The height of the circumferential side wall (16) is less than the height of the convexly curved circumferential wall (15). The textured free surface (5) extends over the circumferential side wall (16). The convexly curved circumferential wall (15) surrounds the transfer base (10). The portion of the outer face (4) covered by the transfer base (10) may be textured if desired.

Figure 7:
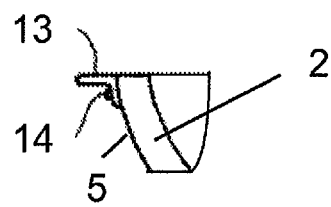
FIG. 7 depicts a partial view of one variation of an embodiment of the cooking utensil depicted in FIG. 6, comprising a handle.
Figure 8:
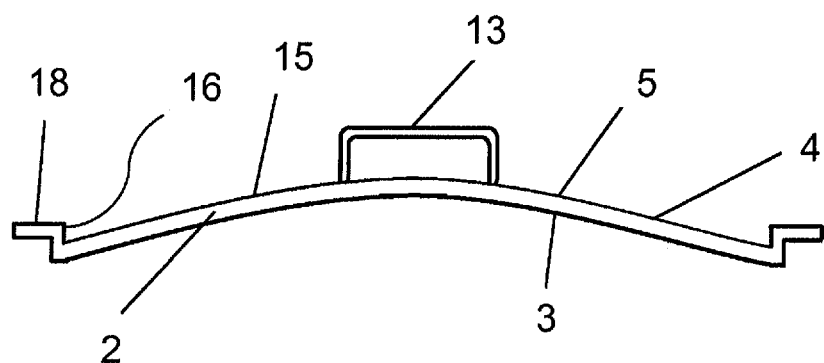
FIG. 8 depicts a schematic cross-sectional view of another example embodiment of a cooking utensil according to the invention, comprising a dome made of textured stainless steel and a handle.

A variety of cooking utensils may be produced, including pans, as shown in FIG. 6, or casseroles, skillets, woks, or the vessels of electrical cooking appliances, and also lids, as depicted in the example in FIG. 8. As depicted in FIGS. 7 and 8, the cooking utensil may comprise at least one handle (13) mounted to the dome (2). The handle (13) may in particular be set on a pin (14) soldered to the dome (2).

As clearly depicted in FIG. 8, the outer face (4) has a convexly curved circumferential wall (15). Thus the textured free surface (5) extends over the convexly curved circumferential wall (15). In the example embodiment depicted in FIG. 6, the convexly curved circumferential wall (15) is extended and surrounded by a circumferential side wall (16). The height of the circumferential side wall (16) is less than the height of the convexly curved circumferential wall (15). The textured free surface (5) extends over the circumferential side wall (16). The convexly curved circumferential wall (15) holds the handle (13). The circumferential side wall (16) is located between the convexly curved circumferential wall (15) and a peripheral flange (18) intended to be situated on the upper edge of the cooking utensil. The upper surface of the peripheral flange (18) may be textured if desired. The portion of the outer face (4) covered by the transfer base (10) may be textured if desired.

The thickness of the stainless steel sheets used usually ranges from 0.5 to 0.8 mm. A typical thickness is 0.6 mm.

The interior of the stainless steel cooking utensil may have a cooking surface or a surface exposed to cooking, and may be uncoated or coated, for example with a PTFE coating or even a sol-gel ceramic coating. The inner face (3) of the dome (2) would then have an interior coating (6).

The method to produce a cooking utensil according to the invention may comprise the following steps:

Cutting the embossed stainless steel blank, typically in the shape of a disc, to form a sheet, or selection of a pre-cut sheet;

Stamping the sheet, typically performed without any protective film covering the texture, to form the dome (2). When a film is used to protect the texture, the protective film is removed after this stamping process. Texturing makes it possible to conceal certain flaws appearing during the stamping process, such as the roping phenomenon that can appear on the side wall of blanks stamped from ferritic stainless steel, or the orange peel effect observed in the rounded sections between the base and the side wall of the stamped blank.

Optionally, hot stamping the transfer base (10). The stamping process is carried out on the dome (2) without any prior mechanical surface treatment. It causes a yellowing of the dome (2) at the base of the side wall. The transfer base (10) ensures temperature uniformity across the cooking surface when the temperature of the cooking utensil is increased.

Optionally, application of an interior coating (6) onto the inner face (3) of the dome (2) forming the cooking surface. In particular, a coating step to apply an PTFE or ceramic interior coating (6) may be applicable. A surface preparation step to enhance the bonding of the interior coating (6), for example, a sanding process, may be considered prior to the coating step. The cooking of these coatings (typically at 430° C. for 20 minutes for the PTFE coating or 250° C. for 15 minutes for a sol-gel ceramic coating) causes a yellowing of the free surface (5) of the outer face (4) of the dome (2).

Polishing of the free surface (5) of the outer face (4) of the dome (2). Polishing is necessary to remove the yellowing introduced by the thickening oxide layer that appears locally when the transfer base (10) is stamped and across the entire surface of the dome (2) when the interior coating (6) is cooked. By selecting the appropriate parameters, it is possible to perform a polishing operation that can remove the yellowing, without degrading the pattern in relief, from the free surface (5) of the outer face (4) of the dome (2). The use of textured stainless steel makes it possible to reduce the extent of polishing required. In fact, as the primary flaws that appear during the stamping process are masked by the texture, there is no need for a pre-polishing step to smooth out the free surface (5) of the outer face (4) of the dome (2) with abrasive particles prior to the brightening step. The brightening step consists of polishing to produce a highly reflective surface, typically using leather, felt or cloth discs covered with polishing products. The brightening step is thus a sufficient finishing step for cooking utensils with a textured outer side.

The resulting cooking utensils have an original exterior finish that is less susceptible to scratching. Additionally, the production steps carried out on the stainless steel blank are simplified, even accelerated, by the reduction of polishing steps.

The essential steps of the method to produce a cooking utensil according to the invention are as follows:

Creation or provision of a sheet from a textured stainless steel blank having at least one textured face (1);

Stamping of the sheet to form a dome (2) comprising an inner face (3) and an outer face (4), the outer face (4) having raised areas corresponding to the textured face (1) of the sheet;

Optionally, partial covering of the outer face of the dome (2), such that the outer face (4) of the dome (2) has a free surface (5);

Mechanical finishing treatment of the free surface of the outer face (4) of the dome (2), to reveal the stainless steel on the raised areas of the free surface of the outer face (4) of the dome (2).

The mechanical finishing treatment performed with a textured stainless steel sheet comprises a brightening finishing polish, without a pre-polishing phase using abrasive particles.

In one variation, a colored, textured stainless steel blank may be considered for use as the raw material. Austenitic stainless steels may, in fact, be colored using the INCO process.

Immersion in a $CrO_3+H_2SO_4$ bath: During this phase, an oxide layer forms on the stainless steel surface and produces an interference coloring on the stainless steel surface. The resulting color is directly related to the thickness of the oxide layer, and thus, the length of the treatment.

Cathodic hardening to make the layer mechanically resistant.

The fragility of the colored film remains problematic. The combination of texturing and coloring helps to overcome this disadvantage. In fact, by lightly polishing the extremities of the patterns, the colored part of the stainless steel is protected in the depressed areas and is thus less susceptible to damage.

The method consists of using a textured stainless steel blank comprising on its textured face (1) a superficial oxide layer producing an interference coloring, and in performing the mechanical finishing treatment to remove the superficial oxide layer on the raised areas of the free surface (5) of the outer face (4) of the dome (2), so as to reveal the stainless steel. A brightening finishing polish is sufficient for such an operation.

Figure 9:
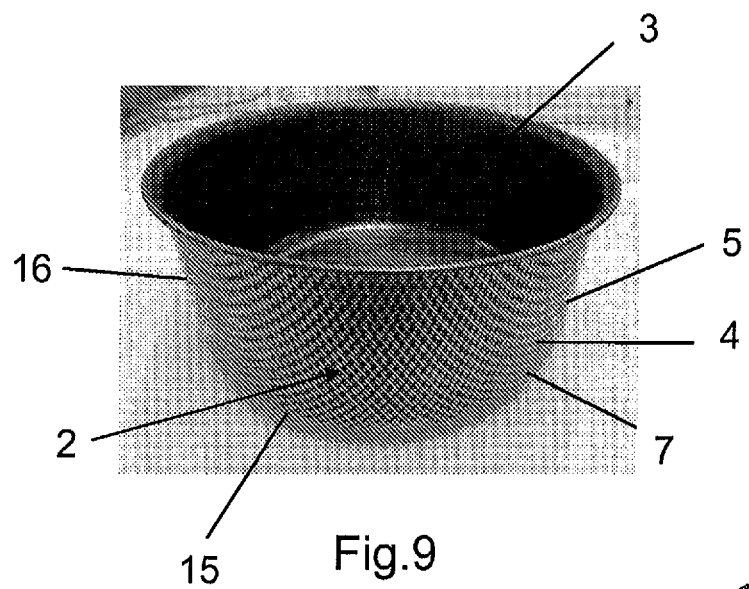
FIG. 9 depicts a perspective view of one variation of an embodiment of a cooking utensil according to the invention, comprising a dome made of colored, textured stainless steel, with FIG. 9a depicting an enlarged view of a part of FIG. 9.
Figure 9A:
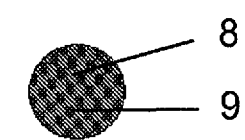

The cooking utensil depicted in FIG. 9 is a vessel produced from a textured blank of stainless steel depicted in FIG. 3, with a repeating checkerboard pattern. The pattern is slightly deformed by the stamping process, as FIG. 9a shows more clearly. The free surface (5) of the outer face (4) of the dome (2) comprises polished protruding areas (8) of stainless steel and colored depressed areas (9). The colored depressed areas (9) have a superficial oxide layer producing an interference coloring. The outer face (4) thus has a partial exterior coating (7). The smallest surface dimension, or the width, of the protruding areas (8) and depressed areas (9) preferably ranges between 0.5 and 3 mm, and has an average value of 2 mm in the embodiment illustrated in FIGS. 9 and 9a. The inner face (3) preferably has no interior coating, as the cooking of a coating alters the thickness of the superficial oxide layer and thus degrades the coloring. As clearly depicted in FIG. 9, the outer face (4) has a convexly curved circumferential wall (15) that is extended and surrounded by a circumferential side wall (16). The textured free surface (5) extends over the convexly curved circumferential wall (15) and the circumferential side wall (16). The height of the circumferential side wall (16) is greater than the height of the convexly curved circumferential wall (15). The dome (2) can receive a transfer base (not depicted in FIG. 9), if desired.

In another possible variation, after producing the textured stainless steel dome (2), the outer face (4) of the dome (2) may be coated with an exterior coating (7) for example a PTFE coating, ceramic coating or lacquer. An exterior coating (7) of PTFE improves the ease of cleaning the free surface (5) of the outer face (4) of the dome (2). The exterior coating (7) may be black or colored. After cooking or drying the exterior coating (7), a post-polishing process makes it possible to reveal the edges of the stainless steel, and to produce decorative effects on the free surface (5) of the outer face (4) of a stainless steel cooking utensil. Such outer sides (4) have improved scratch resistance compared to smooth outer sides equipped with or without a coating.

The method consists of applying the exterior coating (7) to the free surface (5) of the outer face (4) of the dome (2), after the hot stamping assembly of the dome (2) with the transfer base (10) where applicable, and of performing a mechanical finishing treatment comprising a brushing to remove the exterior coating (7) from the raised areas of the free surface (5) of the outer face (4) of the dome (2), to reveal the stainless steel.

Figure 10:
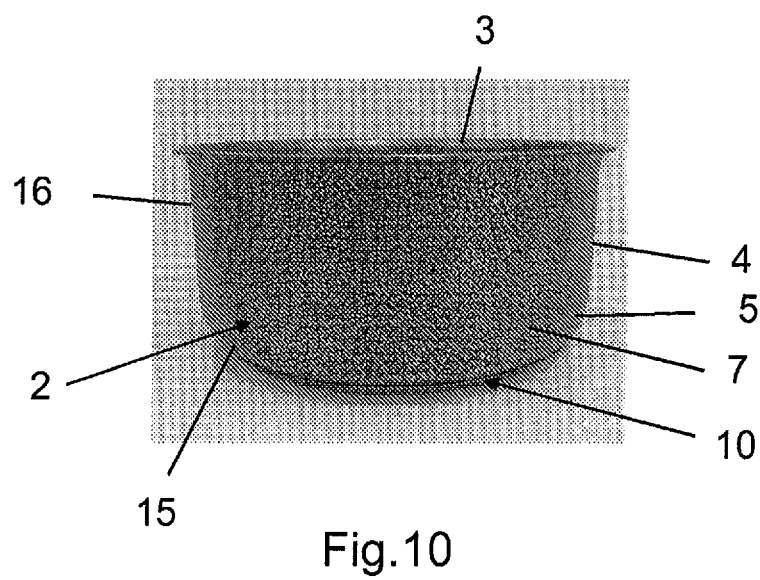
FIG. 10 depicts a perspective view of another variation of an embodiment of a cooking utensil according to the invention, comprising a dome made of textured stainless steel coated with PTFE after polishing, with FIG. 10a depicting an enlarged view of a part of FIG. 10.
Figure 10A:
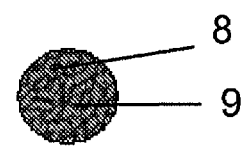

The cooking utensil depicted in FIG. 10 is a vessel with a transfer base (10), produced from a textured blank of stainless steel depicted in FIG. 5 with an irregular or non-repeating pattern. The pattern, which can be seen more clearly in FIG. 10a, is also slightly deformed by the stamping operation. The free surface (5) of the outer face (4) of the dome (2) also comprises polished protruding areas (8) of stainless steel and coated depressed areas (9). Thus, the coated depressed areas (9) may have, in particular, a coating of PTFE, ceramic or lacquer. The outer face (4) thus has a partial exterior coating (7). The exterior coating (7) may be colored, if desired. The smallest surface dimension, or the width, of the protruding areas (8) and the depressed areas (9) preferably ranges from 0.5 to 3 mm, and has an average value of 0.8 mm in the embodiment depicted in FIGS. 10 and 10a. The largest surface dimension, or the height, not necessarily rectilinear, of the protruding areas (8) and depressed areas (9) may be greater than 3 mm. The inner face (3) may or may not have an interior coating. As clearly depicted in FIG. 9, the outer face (4) has a convexly curved circumferential wall (15) that is extended and surrounded by a circumferential side wall (16). The textured free surface (5) extends over the convexly curved circumferential wall (15) and the circumferential side wall (16). The height of the circumferential side wall (16) is greater than the height of the convexly curved circumferential wall (15).

Typically, the method consists of using a circular sheet in the shape of a disc. However, the sheet is not necessarily circular in shape. An elliptical shape may in particular be considered for creating a fish pan or the corresponding lid of such a cooking utensil.

Preferably, to produce cooking utensils such as culinary appliances having even heat distribution, the method consists of performing a hot stamping assembly of the dome (2) with an aluminum heat transfer plate (11) partially covering the outer face (4) of the dome (2) and performing a mechanical finishing treatment on the free surface (5) of the outer face (4) of the dome (2) after the hot stamping assembly of the dome (2) with a transfer base (10) comprising the heat transfer plate (11).

If desired, a hot stamping assembly of the dome (2) with an aluminum heat transfer plate (11) partially covering the outer face (4) of the dome (2) and a stainless steel base plate

(12) covering the heat transfer plate (11) may be performed, with the mechanical finishing treatment of the free surface (5) of the outer face (4) of the dome (2) being performed after the hot stamping assembly of the dome (2) with the transfer base (10) comprising the heat transfer plate (11) and base plate (12).

Advantageously, to improve the properties of the inner face (3) of the dome (2), the method may consist of applying an interior coating (6) to the inner face (3) of the dome (2) prior to the mechanical finishing treatment. Thus preferably, the method consists of applying the interior coating (6) to the inner face (3) of the dome (2) after the hot stamping assembly (2) with the transfer base (10) comprising the heat transfer plate (11) and, if desired, the base plate (12).

If the inner face (3) of the dome (2) is not coated, it is preferable to perform a finish by grinding.

The texturing of the outer face (4) makes it possible to conceal flaws that appear either when the cooking utensil is created (stamping flaws), or when the cooking utensil is used (scratches).

In one variation, the depressed areas (9) are not necessarily colored and/or coated.

The present invention is in no way limited to the described embodiments and their variations, but rather encompasses numerous modifications falling within the framework of the claims.

The invention claimed is:

1. Cooking utensil, comprising a single layer of a stamped dome of stainless steel having an inner face and an outer face, the outer face of the dome having a convexly curved circumferential wall, and in which the outer face of the dome has a free surface,
   wherein the free surface face is a textured free surface,
   wherein the textured free surface extends over the convexly curved circumferential wall, and
   wherein the textured free surface comprises polished protruding areas of stainless steel and depressed areas.

2. Cooking utensil as in claim 1, wherein the convexly curved circumferential wall is extended and surrounded by a circumferential side wall and in that the textured free surface extends over the circumferential side wall.

3. Cooking utensil as in claim 1, wherein the outer face of the dome has embossing indentations of a depth ranging between 20 to 100 μm.

4. Cooking utensil as in claim 3, wherein an aluminum heat transfer plate partially covers the outer face of the dome.

5. Cooking utensil as in claim 4, wherein a stainless steel base plate covers the heat transfer plate.

6. Cooking utensil as in claim 5, wherein the base plate is made of ferritic stainless steel.

7. Cooking utensil as in claim 1, wherein the inner face of the dome has an interior coating.

8. Cooking utensil as in claim 1, wherein the depressed areas are coated and/or colored.

9. Cooking utensil as in claim 8, wherein the depressed areas are equipped with one of the following surfaces: a PTFE coating, ceramic coating, lacquer, and superficial oxide layer producing an interference coloring.

10. Cooking utensil as in claim 1, wherein the dome has a circular shape.

11. Cooking utensil as in claim 1, characterized in that it comprises at least one handle mounted to the dome.

12. Cooking utensil as in claim 1, wherein an aluminum heat transfer plate partially covers the outer face of the dome.

13. Cooking utensil as in claim 12, wherein a stainless steel base plate covers the heat transfer plate.

14. Cooking utensil as in claim 13, wherein the base plate is made of ferritic stainless steel.

* * * * *